Sept. 27, 1955　　　　　R. CLADE　　　　　2,719,023
SPLIT PLUG PROPORTIONING VALVE
Filed June 28, 1951　　　　　　　　　　　　2 Sheets-Sheet 1
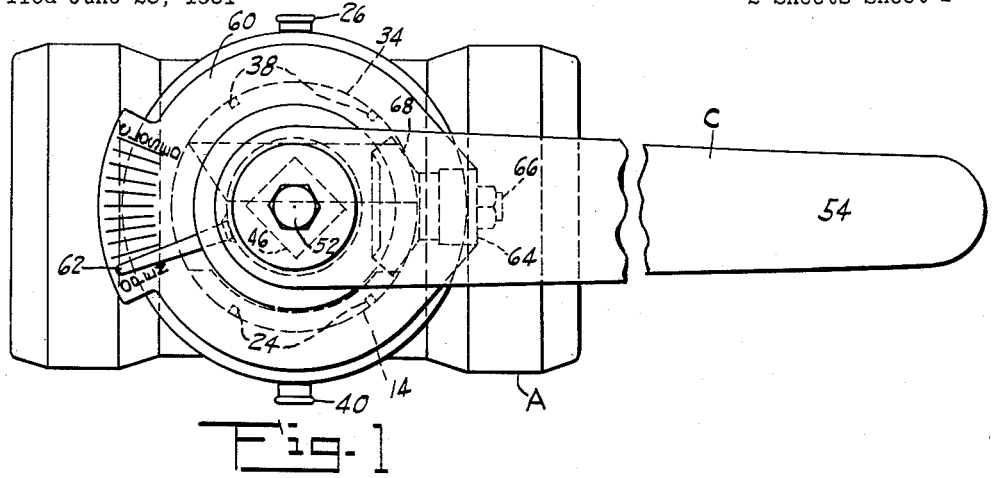
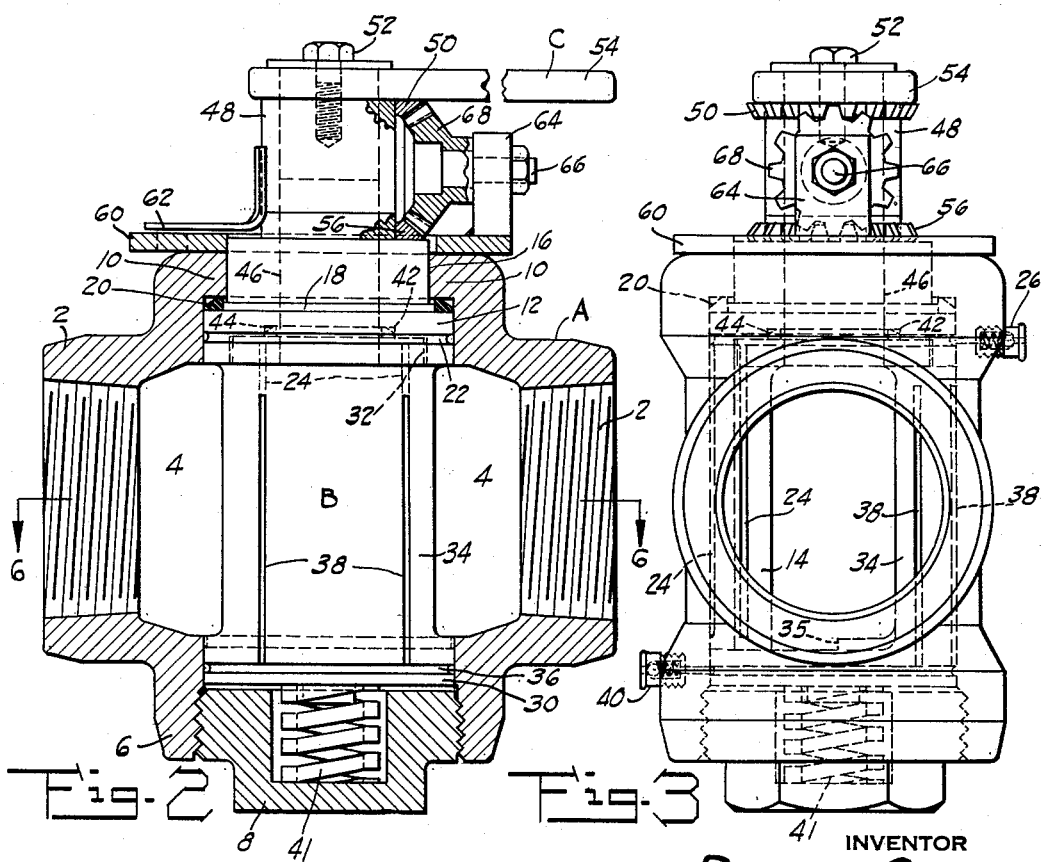
INVENTOR
ROBERT CLADE
BY
Robert A. Shield
ATTORNEY

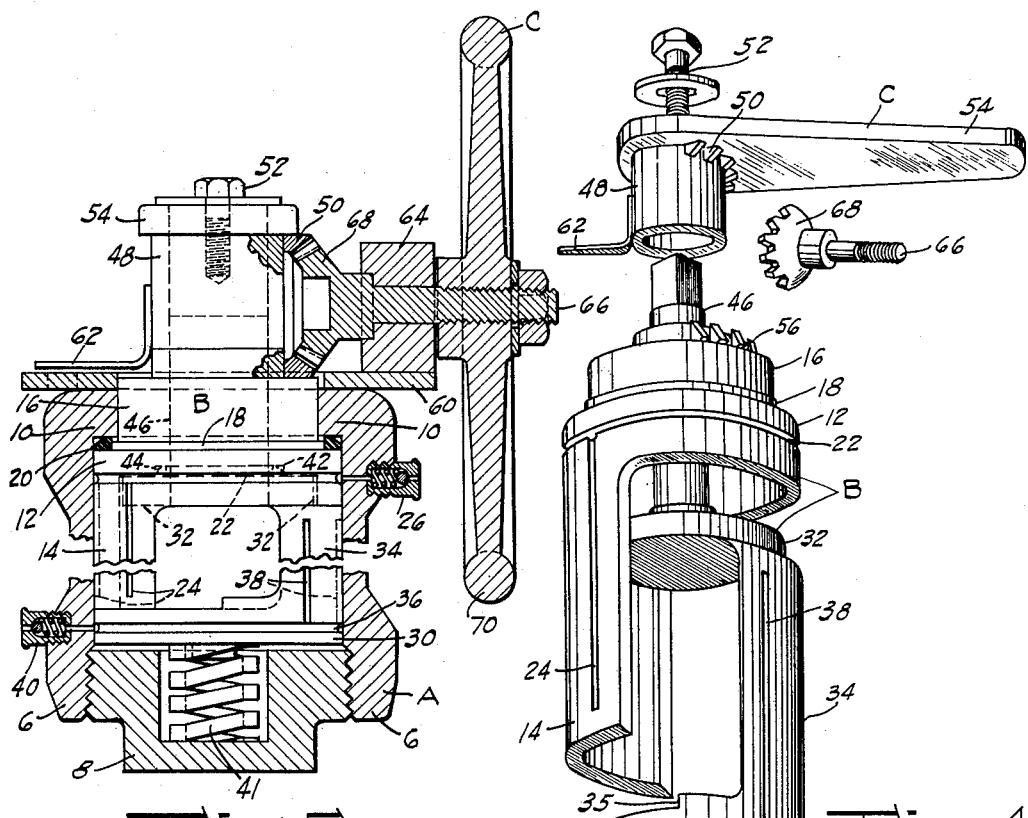

United States Patent Office 2,719,023
Patented Sept. 27, 1955

2,719,023

SPLIT PLUG PROPORTIONING VALVE

Robert Clade, Detroit, Mich., assignor, by mesne assignments, to W-K-M Manufacturing Company, Inc., a corporation of Delaware Application June 28, 1951, Serial No. 234,079

1 Claim. (Cl. 251—212)

This invention relates to valves in general and in particular to valves for accurately proportioning the flow of material through a pipe line.

Conventional plug and other type valves are not suitable for constantly and accurately controlling the rate of flow through a pipe line. They are primarily intended as shut-off valves and when placed in a partly open position to control flow will be rapidly ruined due to the erosive effect of the change direction of flow of the material. It is an object therefore of the present invention to provide a proportioning valve having the parts so constructed and arranged as to always give straight line flow through the valve.

A further object of the invention is the provision of a proportioning valve having a two part plug with the parts rotatable toward each other in unison to limit the flow of material.

A still further object of the invention is the provision of a proportioning valve having two plug parts and two operating stems interconnected so as to cause reverse rotation of the plug parts.

These and other objects of the invention will be apparent to persons skilled in the art from a study of the following description and accompanying drawings, in which Fig. 1 is a plan view of the improved proportioning valve;

Fig. 2 is a vertical section taken substantially through the axis of the valve of Fig. 1;

Fig. 3 is an end view of the valve;

Fig. 4 is an exploded perspective of the component parts of the valve;

Fig. 5 is a sectional view similar to Fig. 2, but showing a slight modification of the operating means; and Fig. 6 is a sectional view taken substantially on line 6—6 of Fig. 2, but showing the parts in substantially closed position.

Referring now to the drawings in detail it will be seen that the valve comprises generally a body part A, a pair of plug parts indicated generally as B, and an operating means indicated generally as C. The body as shown is of generally conventional form, having connecting end portions 2 adapted to receive suitable piping and joined by an opening constituting the flow passage through the valve and indicated generally at 4. Extending transversely of the flow passage is a bore 6 adapted to be closed at its lower end by cap 8 and partially closed at its upper end by overhanging shoulders 10.

The plug, as previously stated, is made in two parts. The first part is of general inverted L shape in elevation. The leg of the L is cylindrical in cross section and is indicated at 12. Depending from this cylindrical portion 12 is a cylindrical shell segment 14, this segment being of sufficient arcuate coverage as to span the distance between the sides of the flow passage when in open position. Extending upwardly from the cylindrical portion 12 is an annular stem 16 having formed at its lower end a shoulder or ledge 18 forming an abutment for a sealing ring 20 adapted to be inserted between the cylindrical portion 12 and the overhanging shoulder 10 of the body. As clearly shown, the cylindrical portion 12 is interrupted by a circumferential groove 22 from which a pair of grooves 24 extend vertically downward against the cylindrical shell segment 14. These grooves may be supplied by lubricant under pressure from a fitting 26.

The second plug part is a general C shape in elevation and is formed with a cylindrical lower portion 30 and cylindrical upper shoulder portion 32 forming the legs of the C and joined together by a cylindrical segment 34 forming the stem of the C. The upper or inner surface of cylindrical part 30 is provided with a ledge 35 constituting a stop against which the cylindrical shell segment 14 may contact in closed position. The lower cylindrical portion 30 and cylindrical segment portion 34 are interrupted by circumferential and vertically extending grooves 36 and 38 respectively which are adapted to be fed from a lubricant fitting 40. As clearly shown, the lower surface of cylindrical portion 30 is provided with a centering boss adapted to receive and center a spring 41 received in cap 8 and constantly urging the valve parts upwardly. The outer surface of cylindrical portion 32 is finished so as to fit loosely within the bored out lower portion of cylindrical part 12. As clearly shown, in Figs. 2 and 5, the cylindrical part 12 is also counter-bored to provide a space 42 for the reception of a sealing means 44 interposed between the upper surface of the cylindrical portion 32 and the under surface of the cylindrical part 12.

In order to cause rotation of the second plug part, a stem 46 extends upwardly through the annular stem 16 of the first plug part and has its upper end squared or otherwise shaped to have driving engagement with a sleeve 48. The sleeve 48 is formed with an enlarged upper end providing an underhanging shoulder to which a gear segment 50 may be welded or otherwise secured. The sleeve 48 will be held in position on stem 46 by any suitable means, such as washer and cap screw 52. As clearly shown in Figs. 1 to 4 inclusive, the enlarged shoulder of sleeve 48 is formed with an operating handle 54 by means of which the valve may be opened or closed. The sleeve 48 extends downwardly and rotatably bears upon the upper end of the annular stem 16, which annular stem is provided with a shoulder to which a gear segment 56 may be welded or otherwise secured.

Fastened to the upper portion of the body is a plate 60 suitably lined and marked to indicate open and closed positions, as well as any desired number of intermediate positions. Welded or otherwise secured to the sleeve 48 is an indicator 62 adapted to move over the index portion of the plate 60. As shown in Figs. 2 and 5 a block 64 is welded or otherwise secured to the plate 60 and is pierced to receive the stem of a bolt 66 on which is rotatably mounted a bevel gear wheel 68. In the case of the modification shown in Fig. 5 the bevel gear wheel is rigidly adapted to the bolt, which is rotatable in block 64 and the bolt is adapted to be driven by the hand wheel 70.

In operating, the valve pressure applied to hand lever 54 will directly cause rotation of the C-shaped part and through the bevel idler 68 will cause reverse rotation of the inverted L-shaped part; and, when the parts are in closed position, they will be in the condition shown in Fig. 6 with the cylindrical shell segment bearing against the ledge 35 as a stop. The meeting edges of the cylindrical shell segment and the cylindrical segment will be positioned substantially in the vertical plane through the flow passage axis and the axis of the plug stems. Thus it will be seen that the plug parts move toward and away from each other at equal rates and will always give straight line flow through the valve regardless of the degree of closure.

While the invention has been described more or less in detail with specific reference to the drawings, it will be apparent that various modifications may be made, and all such modifications are contemplated as will fall within the scope of the appended claim.

What is claimed is:

In a proportioning valve the combination of a body having a flow passage therethrough and a bore intersecting the passage substantially at right angles thereto, a first plug part of inverted L shape in elevation in said bore, the leg of the inverted L being formed as a cylindrical shell portion with an annular stem extending upwardly therefrom out of the valve, a second plug part of C shape in elevation in said bore and having the open side facing toward the vertical portion of said first plug part, the upper leg of the C being formed as a cylinder recessed in said cylindrical shell and having a stem extending upwardly through said annular stem, and sealing means inside the valve between said annular stem and body and between the cylindrical shell portion of said first plug part and the stem of the second plug part, said sealing means being compressed by the pressure of fluid in said flow passage, and means connected to said stems outwardly of said sealing means to cause rotation of said plug parts in the bore and in opposite directions relative to each other.

References Cited in the file of this patent

UNITED STATES PATENTS

| | | |
|---|---|---|
| 696,955 | Figueredo | Apr. 8, 1902 |
| 1,306,006 | Gustafson | June 10, 1919 |
| 1,372,399 | Breeding | Mar. 22, 1921 |
| 1,450,968 | Breeding | Apr. 10, 1923 |
| 2,157,263 | Johnson | May 9, 1939 |
| 2,159,540 | MacClatchie | May 23, 1939 |

FOREIGN PATENTS

| | | |
|---|---|---|
| 920,883 | France | Apr. 21, 1947 |